V. A. WALKUP.
RESILIENT WHEEL.
APPLICATION FILED APR. 23, 1918.

1,339,800.

Patented May 11, 1920.
3 SHEETS—SHEET 1.

WITNESSES
W. C. Fielding
S. M. McColl

INVENTOR
Vincent A. Walkup

BY Richard Owen.

ATTORNEY

V. A. WALKUP.
RESILIENT WHEEL.
APPLICATION FILED APR. 23, 1918.

1,339,800.

Patented May 11, 1920.
3 SHEETS—SHEET 2.

WITNESSES
W. C. Fielding
S. M. McCall

INVENTOR
Vincent A. Walkup
BY Richard B. Owen.
ATTORNEY

V. A. WALKUP.
RESILIENT WHEEL.
APPLICATION FILED APR. 23, 1918.

1,339,800.

Patented May 11, 1920.
3 SHEETS—SHEET 3.

WITNESSES

INVENTOR
Vincent A. Walkup
BY
ATTORNEY

UNITED STATES PATENT OFFICE.

VINCENT A. WALKUP, OF APACHE, OKLAHOMA.

RESILIENT WHEEL.

1,339,800.

Specification of Letters Patent.

Patented May 11, 1920.

Application filed April 23, 1918. Serial No. 230,296.

*To all whom it may concern:*

Be it known that I, VINCENT A. WALKUP, a citizen of the United States, residing at Apache, in the county of Caddo and State of Oklahoma, have invented certain new and useful Improvements in Resilient Wheels, of which the following is a specification.

This invention relates to resilient wheels.

The object of the invention is to provide a wheel of this character which will be an effective substitute for wheels equipped with pneumatic tires.

Another object is to provide a wheel of this character especially applicable to motor trucks and which may be either rubber covered or not, as desired, and which embodies the desirable features of simplicity, strength and durability of construction.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1:
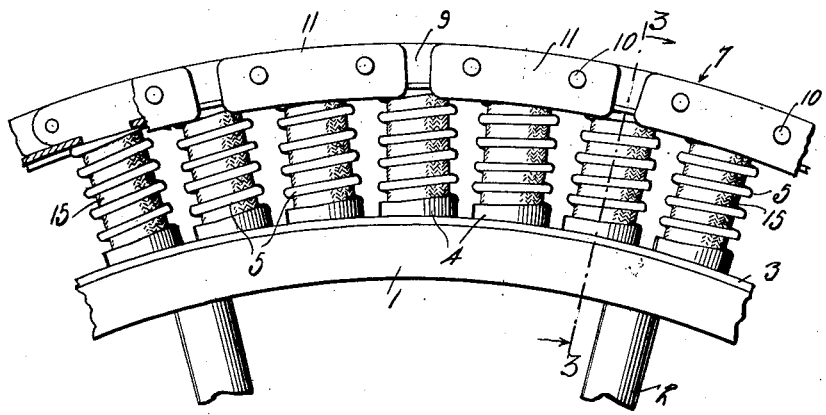
Figure 2:
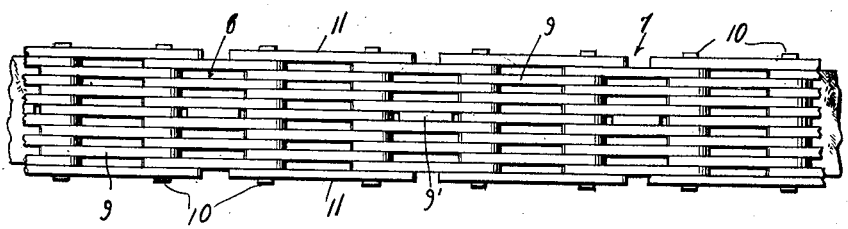
Figure 3:
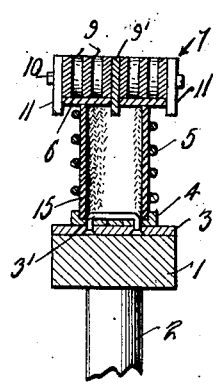
Figure 4:
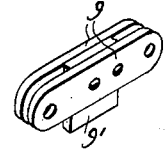
Figure 5:
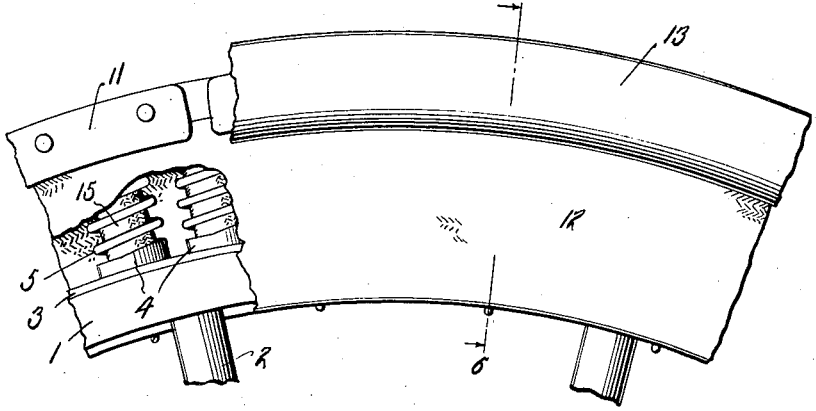
Figure 6:
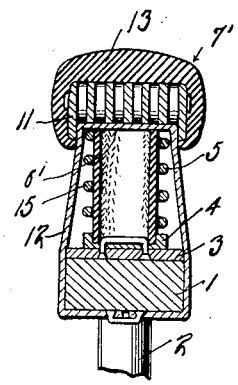
Figure 8:
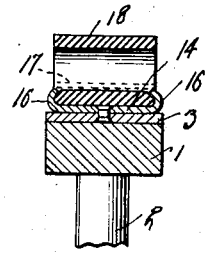
Figure 7:
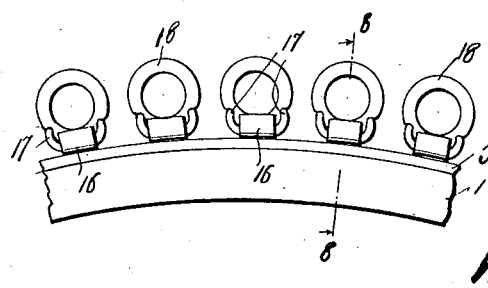

Figure 1 represents a side elevation of a portion of a wheel constructed in accordance with this invention, parts being broken out, Fig. 2 is a top plan view thereof, Fig. 3 is a transverse vertical section taken on the line 3—3 of Fig. 1, Fig. 4 is a detail perspective view of two of the links with the lug which extends into the spring shown mounted between them, Fig. 5 is a side elevation with parts broken out showing the covering for the springs and the rubber tread applied thereto, Fig. 6 is a transverse section taken on the line 6—6 of Fig. 5, Fig. 7 is a side elevation of a portion of a wheel rim embodying a slightly different form of this invention, Fig. 8 is a transverse section taken on the line 8—8 of Fig. 7.

Figure 9:
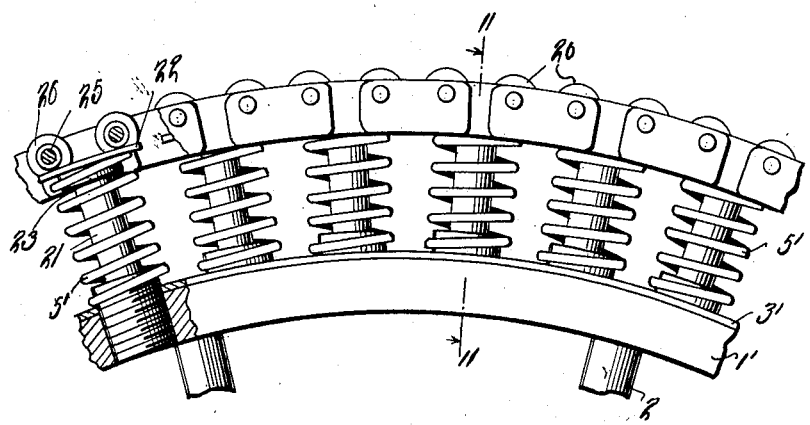
Figure 10:
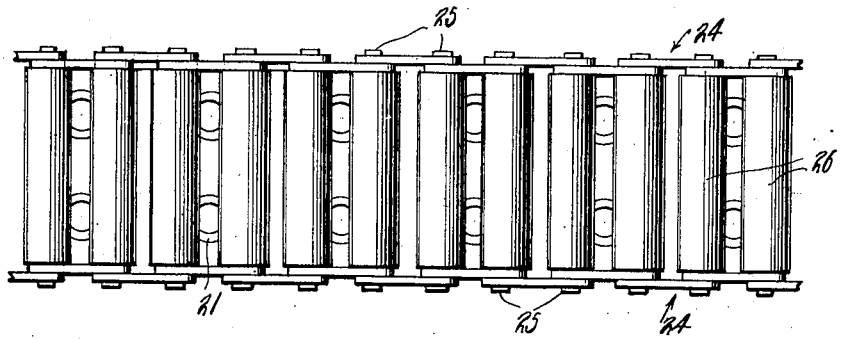
Figure 11:
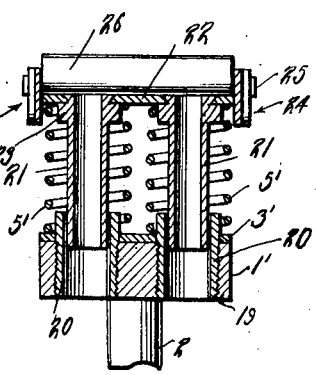

Fig. 9 is a side elevation with parts broken out showing another form of the invention, Fig. 10 is a plan view thereof, and Fig. 11 is a transverse section taken on the line 11—11 of Fig. 9.

In the embodiment illustrated in Figs. 1 to 4, a wheel rim 1 of ordinary construction is shown having the usual spokes 2 connected therewith and provided on its periphery with a metal tire 3 such as is commonly used on wooden wheels.

Mounted around the tire 3 are a plurality of spring socket members 4 which are secured to the tire by any suitable means, inverted U-shaped rivets 3' being here shown for this purpose. (See Fig. 3.) Coiled springs 5 are fixed at one end to the sockets 4 and project radially from the tire 3 and are designed to receive tubular compression members 15 formed of comparatively soft rubber so that when pressure is applied to the tread of the wheel they will yield slightly.

The tread portion 7 is peripherally flexible and transversely rigid, being composed of a plurality of sections 8 of connected links 9, the links of adjacent sections being strung on a single pintle 10, and those of one section arranged to alternate with those of the adjacent section as is shown clearly in Fig. 2. Any desired number of links may be employed according to the width of the wheel tread as shown one section has five links 9 and the next four. These links 9 are arranged between side links 11 of greater width than the intermediate links so as to form housings for the upper or outer ends of the coiled springs 5 to prevent excessive lateral displacement of the tread member relatively to the springs as is shown clearly in Figs. 1 and 3. Reinforcing and spacing plates 6 are arranged between the side plates or links 11, and lugs 9' are secured between two of the centrally disposed links 9 as shown clearly in Figs. 2 and 4, and which are designed to project into the springs 5 through plate 6 as shown in Fig. 3 to assist in retaining the parts against excessive lateral movement.

From the above description it will be obvious that when the parts are assembled as shown in Fig. 1, the resistance of the springs 5 and the rubber tubes 15 will operate as cushions for the wheel and that the connected links 9 will be peripherally flexible and transversely rigid.

The outer edges or faces of the links 9 which form the sections 8 may be notched or roughened if desired to operate as anti-skidding devices and these links having no loose parts for wear will last indefinitely, being disposed edgewise and their edges presented to the surface over which the wheel travels.

In the form shown in Figs. 5 and 6, the structure is identically the same as that described above, except that a flexible casing 12 of any suitable material encompasses the rim 1, springs 5, and tubes 15 as shown clearly in Fig. 6, said casing being here shown extended over the top of tubes 15 as shown at 6', but obviously, it need not be necessarily so made. The reinforcing plates 6 are also omitted from this form of the invention. This form of the invention is also provided with a rubber tread member 13 which extends over the link tread portion around the sides thereof and is secured under the plates 11, being here shown clenched thereto in the manner of a clencher tire. These rubber treads 13 are especially desired when the wheel is to be used over paved streets to prevent injury to the surface of the streets.

In the form shown in Figs. 7 and 8, the usual rim 1 is shown equipped with a metal tire 3, having attaching plates 14 arranged transversely of the wheel rim and provided with up-standing end flanges 16 and side flanges 17 between which are designed to be mounted rubber tubes 18 which may be arranged at any desired distance apart and form a yieldable tread surface for the wheel.

In the form shown in Figs. 9 to 11, a wooden wheel rim 1' is provided with transversely spaced openings 19 arranged in pairs around its periphery and in which are mounted threaded sleeves 20, said sleeves projecting above the outer face of the rim 1' and around which the lower or inner ends of the coiled springs 5' are designed to fit as is shown clearly in Figs. 9 to 11.

What may be termed auxiliary spokes or tubes 21 are mounted for radial movement in the sleeves 20, two of said spokes or tubes being carried by a plate 22 and slidable in the sleeves, the springs 5' operating to hold them at the limit of their outward movement as is shown clearly in Figs. 9 and 11.

These tubular spokes 21 are provided near their outer ends with annular bosses 23, around which fit the upper ends of the springs 5', as is shown clearly in Fig. 11. The plates 22 which carry the tubes 21 correspond in length to the width of the wheel tread and are disposed between two series 24 of connected links. The pintles 25 which flexibly connect the links of each series extend through metal rollers 26 which form the tread or surface engaging portion of this form of the invention.

From the above description it will be obvious that the tubes 21 and sleeves 20 telescopically engage and are held normally at their extreme outward limit by means of the coiled springs 5' so that when pressure is applied the springs will yield and permit the tubes 21 to move inwardly through the sleeves 20 to provide the proper cushioning and shock absorbing effect.

From the above description it will be obvious that a wheel constructed in accordance with this invention will wear indefinitely, withstand great strains and thereby is especially applicable for use on trucks, although of course it may be used on other vehicles.

The foregoing description and the drawings have reference to what may be considered the preferred or approved form of my invention. It is to be understood that I may make such changes in construction and arrangement and combination of parts, materials, dimensions, et al., as may prove expedient and fall within the scope of the claimed invention.

Having thus fully described my invention, what I claim as new and desire to secure by Letters Patent, is:—

A vehicle wheel including a fixed rim and a tread member spaced radially from each other and yieldably connected, the tread member being composed of a plurality of pivotally connected series of edgewise disposed links, the links on the side edges being wider than the others to form housings, reinforcing and spacing plates carried between the said side links, and lugs secured between two center links of some of the series of links and projecting through said plates.

In testimony whereof I affix my signature in presence of two witnesses.

VINCENT A. WALKUP.

Witnesses:
ARTHUR C. DOLF,
CHAS. M. SMITH.